United States Patent [19]
Maillart et al.

[11] Patent Number: 5,612,905
[45] Date of Patent: Mar. 18, 1997

[54] THREE-DIMENSIONAL MEASUREMENT OF LARGE OBJECTS

[75] Inventors: Jean-Luc H. R. Maillart, Bouc Bel Air; Michel Lequime, Eguilles; Pascale Bellamy, Senlis; Gabriel De Smet, Enghien les Bains, all of France

[73] Assignees: Sollac, La Defense; Bertin et Compagnie, Plaisir, both of France

[21] Appl. No.: 442,422

[22] Filed: May 16, 1995

[30] Foreign Application Priority Data

May 19, 1994 [FR] France ..................... 94 06238

[51] Int. Cl.⁶ .......................... G01B 17/06; G01B 11/24
[52] U.S. Cl. ................... 364/561; 250/559.22; 356/2; 356/376; 364/559; 367/907
[58] Field of Search ................. 250/559.22, 559.23; 356/2, 3.05, 375, 376; 364/559, 561; 367/907

[56] References Cited

U.S. PATENT DOCUMENTS

| | | | |
|---|---|---|---|
| 4,791,482 | 12/1988 | Barry et al. | 356/375 X |
| 4,961,155 | 10/1990 | Ozeki et al. | 364/559 |
| 4,991,148 | 2/1991 | Gilchrist | 367/907 X |
| 5,473,436 | 12/1995 | Fukazawa | 356/376 |

*Primary Examiner*—Edward R. Cosimano
*Attorney, Agent, or Firm*—Jacobson, Price, Holman & Stern, PLLC

[57] ABSTRACT

A three-dimensional measurement method and device are intended for fast and accurate measurement of large objects such as vehicles. The method includes the steps of determining approximate measurement positions of a shape measurement sensor; positioning the sensor at successive approximate measurement positions to read off the shape of surface portions of the object represented by points on the object whose co-ordinates are expressed in a system of axes fixed relative to the sensor; identifying accurate positions of the sensor at the approximate measurement positions relative to a predetermined fixed system of axes; and converting the co-ordinates of the points of the surface portions expressed in the system of axes fixed relative to the sensor into co-ordinates expressed in the fixed system of axes on the basis of the identified accurate positions of the sensor.

14 Claims, 10 Drawing Sheets

E 11 — MOUNTING ULTRASONIC TRANSDUCERS $22_n$ (FIG. 4)

E 12 — FIRST DISPLACEMENT AND MEASUREMENT CYCLE $(X_m, Y_n, Z_{m,n})$ (FIG. 5)

E 13 — SECOND DISPLACEMENT AND MEASUREMENT CYCLE $(X1_m, Y1_n, Z1_{m,n})$

E 14 — WIRE-MESH MODEL (FIG. 6)

FIG.10

- E30 (bracket)
- E31 — MOUNTING SENSOR 3 FIG.8
- E32 — INITIALIZING : r = 1
- E33 — POSITION $PM_r$
- E34 — MEASUREMENT OF SURFACE PORTION
- E35 — POSITION OF PROBE
- E36 — CHANGE SYSTEM OF AXES MEMORISING
- E37 — r = R ? NO → r = r+1 (loop to E33); YES → END

THREE-DIMENSIONAL MEASUREMENT OF LARGE OBJECTS

BACKGROUND OF THE INVENTION

1. Field of the Invention

The present invention concerns a method for three-dimensional measurement of objects, and in particular large objects, and a three-dimensional measuring device including mobile measuring means which at no time come into contact with the objects to be measured.

2. Description of the Prior Art

The prior art comprises many three-dimensional measuring machines. A swan-neck type machine is conventionally used in metrology, for example. This type of machine offers good measurement accuracy, but is restricted to measuring objects of small size and weight, typically less than one meter and 100 kilograms. A gantry (boom or bridge) type machine is suitable for large objects but is not so accurate, because of the heterogeneous nature of its construction and the number of moving parts that it includes.

For large objects, for example objects from five to ten meters long, the prior art teaches the use of an intersection measurement system including two theodolites which can be moved around the object to be measured, for example. Each time that the theodolites are moved and positioned, the orientation of each theodolite has to be determined relative to the other theodolite and relative to a fixed system of axes. The measurements are then carried out point by point. The accuracy of the measurements produced by an intersection measurement system is in the same order of magnitude as that of a swan-neck type three-dimensional measuring machine. However, the use of two theodolites is difficult and it takes a long time to measure an object.

OBJECT OF THE INVENTION

The main object of this invention is to provide a three-dimensional measuring method with which the shape of a large object is acquired accurately and faster and more accurately than in the prior art.

SUMMARY OF THE INVENTION

Accordingly, a method for three-dimensional measurement of the surface of an object by shape measuring means is characterized in that it comprises the steps of:

determining approximate measurement positions of the shape measuring means, positioning the shape measuring means successively at the approximate measurement positions to read off the shape of surface portions of the object, the surface portions being each represented by points of the object, co-ordinates of the points being expressed in a system of axes fixed relative to the shape measuring means, identifying each of the approximate measurement positions of the shape measuring means accurately in a predetermined fixed system of axes, and transforming the co-ordinates of the surface portion points expressed in the system of axes fixed relative to the shape measuring means into co-ordinates of the surface portion points expressed in the predetermined fixed system of axes according to the approximate measurement positions of the shape measuring means identified in the fixed system of axes respectively.

A position of the shape measuring means is defined by co-ordinates in a system of axes and by the orientation of the shape measuring means.

The preliminary step of determining the approximate measurement positions comprises the steps of:

generating a wire-mesh model of the surface of the object, the wire-mesh model comprising a plurality of meshes, selecting at least one point on each mesh of the plurality of meshes, defining an axis substantially perpendicular to each mesh passing through the at least one point, and determining a measurement position substantially situated on the axis.

According to a first embodiment, the step of generating a wire-mesh model of the surface of the object comprises the steps of:

positioning distance measuring means at successive predetermined positions distributed in a measurement space, measuring distances from the distance measuring means to the object for the successive predetermined positions of the distance measuring means respectively, and generating the wire-mesh model of the object on the basis of the measured distances.

The step of generating a wire-mesh model of the surface of the object comprises more precisely the steps of:

positioning at least one distance measuring means at successive predetermined first positions in a plane parallel to a support on which the object rests, measuring first distances from the distance measuring means to the object for the successive predetermined first positions, calculating respective second positions on the basis of the successive predetermined first positions and the first distances so that the second positions are at second distances from the object in a predetermined range, positioning the distance measuring means successively at the second positions and measuring second distances from the distance measuring means to the object for the second positions, and generating the wire-mesh model of the object on the basis of the measured second distances.

The step of generating a wire-mesh model of the surface of the object further comprises the step of determining at least one area of space in which there is none of the approximate measurement positions of the shape measuring means.

The step of generating a wire-mesh model is quickly carried out. The accuracy of positioning and measuring in this step can be low. The wire mesh model of the object is an approximate model. In an alternative embodiment, the step of generating a wire-mesh model can be replaced by a model already made, for example resulting from a previous model.

According to another aspect of the invention, the step of identifying each of the approximate measurement positions of said shape of measuring means comprises the steps of:

pointing reference means fixed relative to the shape measuring means successively towards at least three predetermined points in the fixed system of axes, determining the orientations of the reference means in the fixed system of axes for the three predetermined points, respectively, defining a reference system of axes fixed relative to the reference means on the basis of the three predetermined points and the orientations, and establishing a first transformation matrix from the reference system of axes to the fixed system of axes.

Furthermore, the step of transforming comprises the steps of:

establishing a second transformation matrix from the system of axes fixed relative to the shape measuring means to the reference system of axes, and establishing a third transformation matrix from the system of axes fixed relative to the shape measuring means to the fixed system of axes on the basis of the first transformation matrix and second transformation matrix.

The steps of identifying the position of the measuring means and of transforming the measurement result are preferably carried out with great accuracy so that the final measurement result is accurate.

The invention also concerns a device for three-dimensional measurement for implementing the measurement method according to the invention, comprising mobile object shape measuring means operative without contact with the object. According to the invention, this device further comprises:

mobile distance measuring means for measuring distances from the mobile distance measuring means to the object for predetermined measurement positions of the mobile distance measuring means, means for successively positioning the mobile distance measuring means at the predetermined measurement positions, means for positioning the object shape measuring means at positions determined from the predetermined measurement positions of the mobile distance measuring means and from the measured distances so that the mobile shape measuring means read off the shape of surface portions of the object at the determined positions, and means for identifying the determined positions of the mobile shape measuring means in a predetermined fixed system of axes.

Preferably, the mobile distance measuring means comprises at least one ultrasonic transducer or a linear array of ultrasonic transducers.

According to another embodiment, the mobile shape measuring means comprises an optical probe for reading off the shape of surface portions of the object.

The mobile optical probe comprises a light source for illuminating a grating of parallel fringes and forming an image of the grating for each of the surface portions of the object in succession, and photodetectors for detecting the image of the grating.

Advantageously, the identifying means comprises a camera movable mounted on said shape measuring means and orientable independently of the mobile shape measuring means, and fixed reference panels, targets being located on faces of the fixed reference panels and having co-ordinates predetermined in the predetermined fixed system of axes thereby identifying positions of the camera and mobile shape measuring means in the predetermined fixed system of axes.

When the positioning means are a gantry above and around the object to be measured, the shape measuring means preferably comprises means for detecting the proximity of obstacles during displacement of the shape measuring means. For example, the obstacle can be a column of the gantry.

BRIEF DESCRIPTION OF THE DRAWINGS

Other features and advantages of the present invention will be apparent more clearly from a reading of the following description of various preferred embodiments of the invention given with reference to the corresponding appended drawings.

FIG. 3 shows an algorithm of the invention for meshing the surface of an object.

FIG. 10 shows a shape measuring algorithm of the invention.

DESCRIPTION OF THE PREFERRED EMBODIMENT

Figure 1:
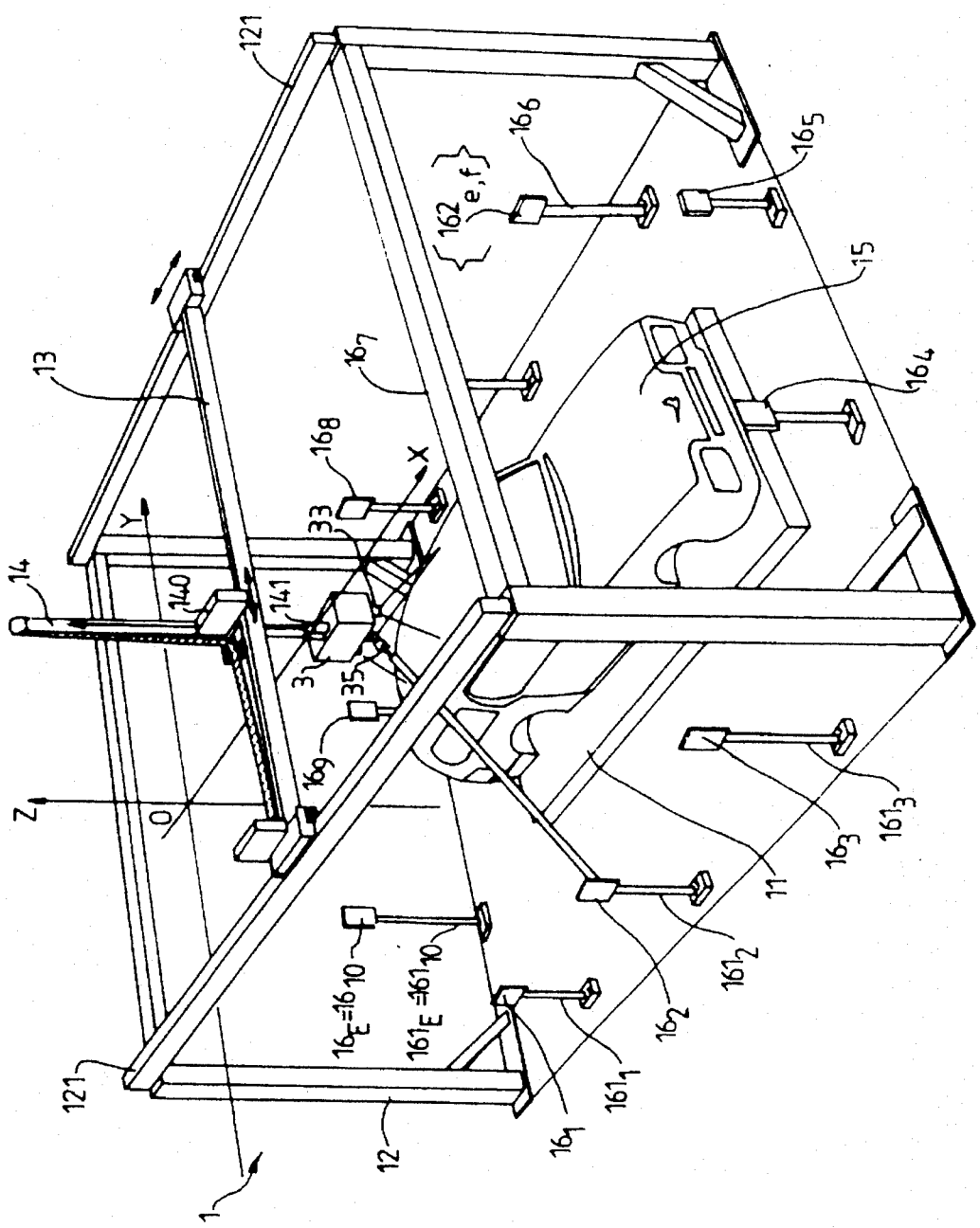
FIG. 1 is a perspective view of a three-dimensional measuring device of the invention fitted with a shape measuring sensor.

Referring to FIG. 1, a three-dimensional measuring device comprises a bridge type measuring gantry 1 controlled by a computer (not shown). The gantry comprises a fixed structure 12 of columns and beams delimiting a parallelepiped-shape (for example cubic) volume above and around a platform 11 resting on the ground and adapted to receive an object to be measured.

Two parallel horizontal beams defining two upper longitudinal edges of the parallelepiped-shape volume each support a rail 121. The two parallel rails 121 guide small driven and driving carriages constituting the ends of a crossmember 13 movable in a horizontal plane defining the upper face of said volume. The crossmember 13 constitutes a guide rail for a carriage 140 carrying drive means for displacing a rack 14 along the crossmember 13 and in a vertical plane. The lower end of the rack 14 carries a holding tool 141 for holding tools such as a measuring sensor as described below. The lower end of the rack 14 can be moved to a multitude of different positions within the parallelepiped-shape volume previously defined. The crossmember 13 and the rack 14 are moved by a set of DC drive motors (not shown) controlled by the computer. The gantry also comprise vibration dampers (not shown) or is installed on a floating slab (not shown) to damp vibration due to displacement of the moving parts (rack and crossmember).

The dimensions of the gantry depend on the size of the objects to be measured; the gantry is about ten meters long, for example, about eight meters wide and about five meters high and is intended for measuring large objects. The object to be measured is a vehicle or the body of an automobile 15 or a modified piece of body or the enclosure of a machine, for example, placed on the platform 11 and possibly fixed to the latter to immobilize it during the measurements.

In an alternative embodiment the gantry is replaced by a boom structure or by an articulated robot guided along a rail.

The gantry 1 is associated with an orthogonal system of axes comprising an origin O and three axes X, Y, Z intersecting at O. The origin O is on one shorter side of the gantry, the X axis is horizontal and parallel to the longer sides of the gantry, the Y axis is horizontal and parallel to the shorter sides of the gantry and the Z axis is vertical and is on said shorter side. The position and the orientation of the system of axes (O, X, Y, Z) are fixed and arbitrary. In practise the system of axes (O, X, Y, Z) is embodied in a fixed horizontal table or slab which further enables calibration of the measuring sensor.

The measuring device further comprises reference panels $16_1$ through $16_E$ the function of which is explained below, E denoting a positive integer equal to ten, for example. The panels $16_1$ through $16_E$ are fixed to respective rigid vertical support rods $161_1$ through $161_E$ disposed on the ground outside and around the measuring volume. The rods $161_1$ through $161_E$ are different lengths so that the panels are at different heights. One face of a panel $16_e$ facing towards the measuring volume includes targets $162_{e,1}$ through $162_{e,F}$ regularly distributed over that face, the index e varying from 1 to E. Each target $162_{e,f}$ is a small plane diffusing surface, for example a disk or a ring. The index f varies from 1 to an integer F in the order of several tens. In an alternative embodiment the target $162_{e,f}$ is a diffusing sphere which has the property of diffusing light with exactly the same distribution in all directions. The targets are illuminated by light sources (not shown), for example by one or two light sources for each reference panel. The panels $16_1$ through $16_E$ are fixed and the position of each target $162_{e,f}$ is determined, for example by means of theodolite measurements, so that each target is identified by a point with co-ordinates expressed in the fixed system of axes (O, X, Y, Z).

Figure 2:
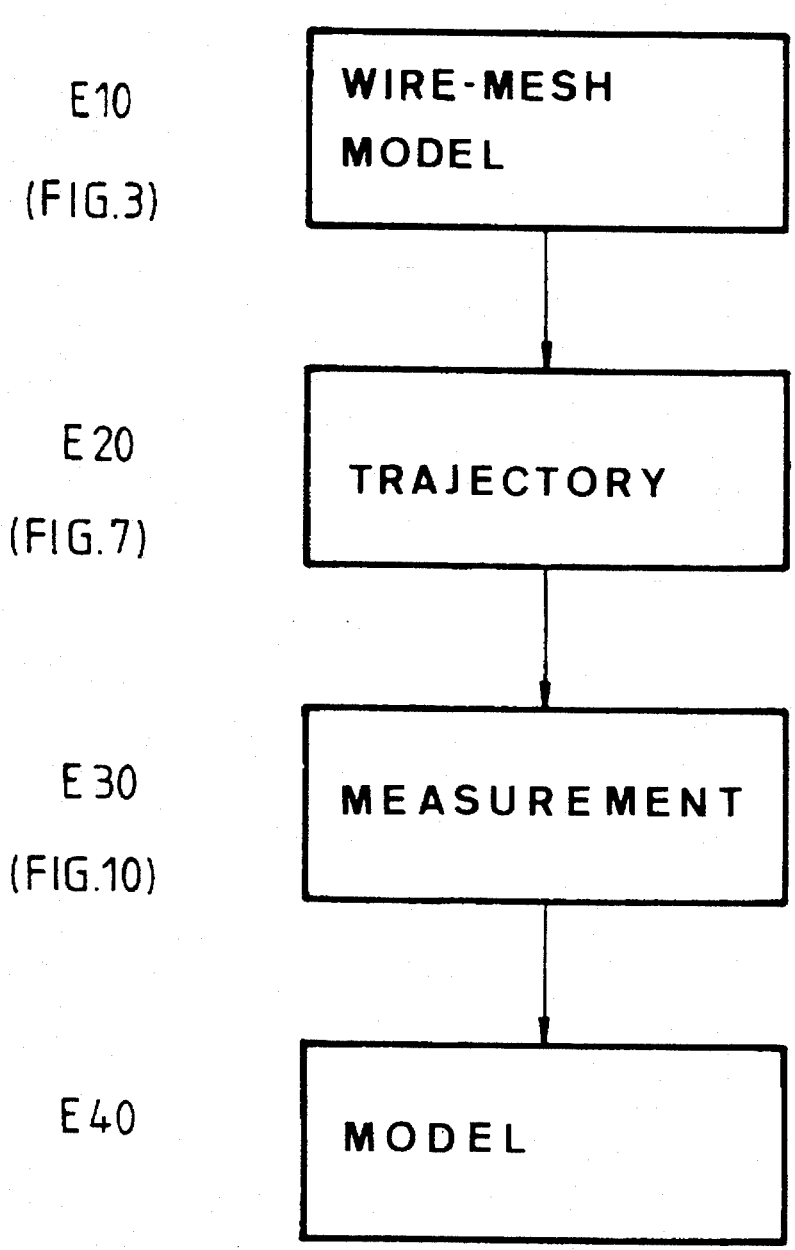
FIG. 2 is a flowchart showing the main steps of a three-dimensional measuring method of the invention.

The three-dimensional measuring method is described with reference to FIG. 2 and is implemented in the form of an algorithm comprising four main steps E10 through E40 programmed in the computer.

Step E10 is an approximate determination of the global surface envelope of the object to be measured. At the end of this step an approximate wire-mesh model of the object to be measured is produced. The main step E10 comprises four steps E11 through E14 which are described with reference to FIG. 3.

The main step E20 determines the trajectory of a shape measuring sensor around the object to be measured, on the basis of the wire-mesh model of the object arrived at in step E10. The main step E20 comprises six steps E21 through E26 which are described with reference to FIG. 7.

The main step E30 concerns proper three-dimensional measurement of surface portions of the object by the sensor at successive positions along the trajectory previously determined. Step E30 includes operations of displacing the sensor, reading off the shape of the surface portion of the object and determining the accurate position of the sensor which are described with reference to FIG. 10 (steps E31 through E37). At the end of step E30 the precise co-ordinates of measurement points on the surface of the object to be measured have been acquired.

The main step E40 processes the measurement points acquired in step E30 to determine a mathematical model of the object, for example a model to be interpreted by CAD (Computer-Aided Design) software. Uses for a model of this kind include comparison of an object with the design of the object produced using CAD software, comparison of an object with the design of the press tool with which the object was made or modeling a prototype object such as a styling mock-up.

The main step E40 includes meshing, interpolation and smoothing steps which depend on the intended use of the three-dimensional measurements obtained.

Referring to FIG. 3, step E10 of determining the global envelope of an object 15 resting on the measurement platform 11 includes a first step E11 of mounting distance measuring means in the form of ultrasonic transducers on the gantry.

Figure 4:
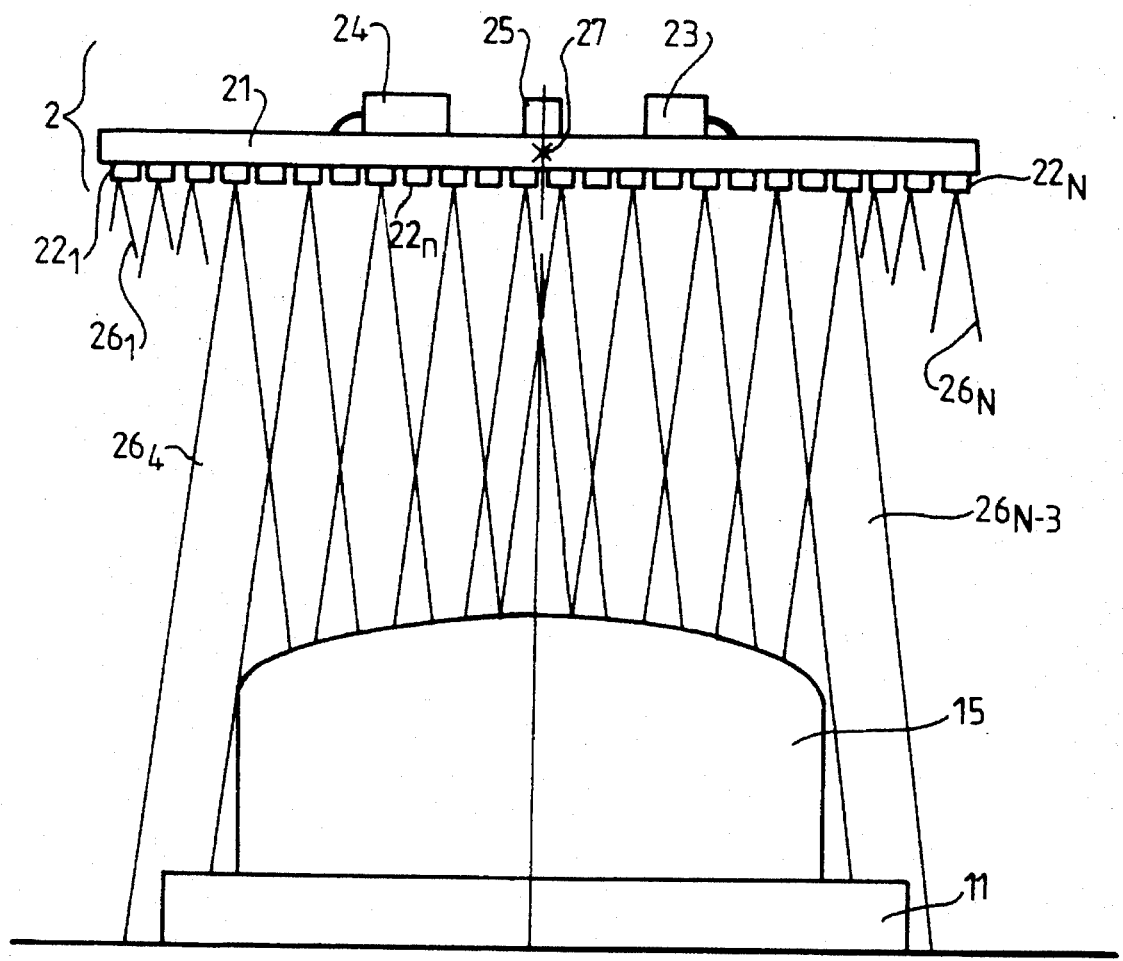
FIG. 4 is a diagrammatic view of a linear array of ultrasonic transducers of the invention.

Referring to FIG. 4, a linear transducer array 2 comprises a support beam 21 on which are mounted N transducers $22_1$ through $22_N$ where N is an integer which depends on the sizes of the objects to be measured and the gantry; for a gantry as described, N is equal to 24, for example. The array 2 also includes an electronic circuit 23 for shaping signals and exchange of signals between the transducers $22_1$ through $22_N$ and the computer (not shown), an electrical power supply circuit 24 to supply power to the transducers and the circuit 23 and a holding end 25 which can be grasped by the holding tool 141 of the rack 14 on the gantry.

The transducers $22_1$ through $22_N$ are regularly disposed along the beam 21 and oriented in a common direction so that the transmission cones $26_1$ through $26_N$ of the transducers all face in the same direction orthogonal to the beam 21. In a different embodiment of the invention, transducers at one end or at both ends of the beam 21 have a transmission cone with an axis at a slight angle to the direction orthogonal to the beam 21 and directed in the plane of FIG. 4 towards the center of the beam 21 so that substantially vertical sides of the object 15 to be measured are "scanned" by the end transducers during the displacement and measurement cycles described below. In a further embodiment of the invention, transducers have a transmission cone with an axis at a slight angle to the direction orthogonal to the beam 21 but directed to the front or to the rear of the plane of FIG. 4.

In all cases, the ultrasonic transducers have a resolution in the order of one centimeter for a measurement range of around 0.5 meter to five meters and a transmission cone angle between about 15° and about 30°.

The transducer array 2 is fixed to the rack 14 by means of the holding end 25 of the array which is coupled to the holding tool 141 of the rack 14. It is mounted manually by an operator or automatically by a tool changer. When the array 2 is mounted at the lower end of the rack 14, it is parallel to the crossmember 13 and occupies substantially all of the width of the interior parallelepiped-shape volume of the gantry 1 between the columns of the latter.

The transmission cones of the transducers are directed vertically downwards; in alternative embodiments of the invention some transmission cones are directed slightly towards the center of the gantry or slightly to the front and to the rear of the plane of FIG. 4.

Figure 5:
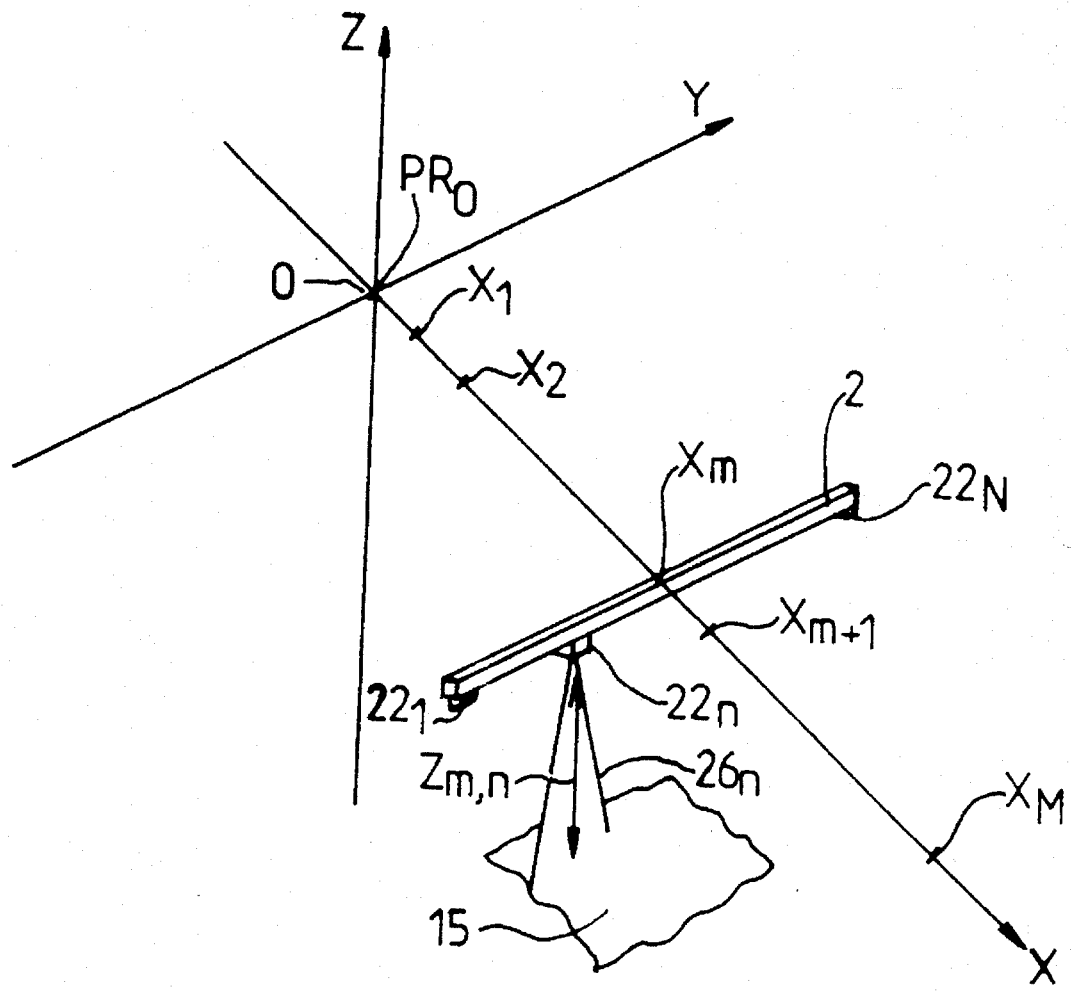
FIG. 5 is a diagrammatic perspective view of an ultrasonic transducer array showing positions of the latter in a fixed system of axes.

Referring to FIG. 5, step E12 comprises displacement of the array 2 into a position $PR_O$ such that it is at a maximal height and at one end of the gantry. This position corresponds to coincidence of the origin O and of the center 27 of the array 2, for example, the longitudinal axis of the array being then coincident with the Y axis.

The step E12 comprises a cycle of displacement of the transducer array along the X axis. The array remains at a constant co-ordinate on the Z axis. It remains parallel to the Y axis. During the displacement cycle the array 2 is displaced the full length of the gantry (parallel to the X axis) and positioned automatically at a plurality of successive first positions $PR_1$ through $PR_M$ with respective abscissae $X_1$ through $X_M$ along the X axis. In this way the array 2 sweeps out a horizontal plane parallel to the platform 11 on which the object 15 to be measured rests. The number M of first positions and the distance between adjacent first positions are either fixed or selected by an operator according to the size of the object to be measured. The distance between two adjacent measuring positions is preferably less than the dimensions of the field of the measuring sensor used in step E30, as explained below with reference to FIG. 9.

At each of m first positions $PR_m$ ($X_m$) of the array 2, where m is an integer between 1 and M, a series of measurements is effected by the transducers $22_1$ through $22_N$. Each transducer $22_n$ activated, where n is an integer between 1 and N, emits an ultrasonic beam downwards and contributes to evaluation of the distance traveled by the beam on the basis of the time to receive the returning echo.

The transducers $22_1$ through $22_N$ are preferably activated in succession to avoid interference between echoes received by different transducers. The result of a measurement by a transducer $22_n$ when the array 2 is at a position $PR_m$ is a first triplet of values ($X_m$, $Y_n$, $Z_{m,n}$) in which $X_m$ is the abscissa of the first position $PR_m$ of the array 2 along the X axis, $Y_n$ is the first position of the transducer $22_n$ along the Y axis and $Z_{m,n}$ is the result of the measurement by the transducer $22_n$, expressed in the form of a first vertical distance of the object relative to the array. The computer memorizes the triplet ($X_m$, $Y_n$, $Z_{m,n}$). When the array 2 has traveled the full length of the gantry along the X axis, M×N first triplets ($X_1$, $Y_1$, $Z_{1,1}$) through ($X_M$, $Y_N$, $Z_{M,N}$) have been memorized.

A consistency check is carried out on the triplets to filter out and eliminate aberrant measurements such as a value $Z_{m,n}$ differing by more than a predetermined threshold from the adjacent values $Z_{m-1,n}$, $Z_{m+1,n}$, $Z_{m,n-1}$ and $Z_{m,n+1}$, for example. The result of the consistency check is a set of corrected triplets ($X_m$, $Y_n$, $Z_{m,n}$) which is used to determine the trajectory of the displacement cycle of step E13 described next.

Step E13 comprises a cycle of displacement of the array 2 from the abscissa $X_M$ to the abscissa $X_1$, again without displacement along the Y axis, but this time with second Z-axis co-ordinates $ZP_M$ through $ZP_1$ determined from the previously mentioned first distances $Z_{m,n}$.

The objective of this second cycle of displacement is to measure the object more accurately. To this end, at each abscissa $X_m$, the vertical position $ZP_m$ of the array 2 is calculated such that the array 2 is at a second measuring distance DM from the object to be measured within a predetermined range, typically about 0.6 meter to about one meter. The value of $ZP_m$ is equal to the largest of the measured values $Z_{m,1}$ through $Z_{m,N}$ plus the distance DM, for example. Alternatively, the value of $ZP_m$ is equal to the largest mean value of the measured values $Z_{m,1}$ through $Z_{m,N}$ plus the distance DM and the largest of the values $Z_{m,1}$ through $Z_{m,N}$ plus a minimal measuring distance less than DM and equal to about 0.4 meter in the case of ultrasonic transducers. In all cases, a minimal safe distance is maintained between the array 2 and the object 15 to be measured to prevent any possibility of collision.

When the second Z-axis co-ordinate $ZP_m$ of the array 2 have been determined, the array 2 is positioned at successive second positions defined by an abscissa $X_m$ and a Z-axis co-ordinate $ZP_m$ and a series or second distance measurements is carried out in a similar manner to the first series of measurements of step E12. Each second vertical distance measured between the corresponding transducer and the object 15 is corrected by the value of the Z-axis co-ordinate of the array 2 so that all the second distances are expressed in the system of axes (O, X, Y, Z) previously defined. In a different embodiment of the invention, the calculation of a second Z-axis co-ordinate $ZP_m$ is immediately followed by positioning of the array at a position defined by the co-ordinates $X_m$ and $ZP_m$ followed by successive measurements using the transducers $22_1$ through $22_N$. The second Z-axis co-ordinate corresponding to the second next position is then calculated, and so on. In all cases, when the array has traveled the full length of the gantry along the X axis, the array is again at the position $PR_O$ and is separated from the holding tool 141. A total of M×N second triplets ($X1_1$, $Y1_1$, $Z1_{1,1}$) through ($X1_M$, $Y1_N$, $Z1_{M,N}$) have been memorized, expressed in the fixed system of axes, and where $X1_1$ through $X1_M$ denotes the successive abscissae of the array, $Y1_1$ through $Y1_N$ denote the ordinates of the transducers $22_1$ through $22_N$ and $Z1_{1,1}$ through $Z1_{M,N}$ are the successively measured Z-axis co-ordinates of the object 15. The triplets ($X1_m$, $Y1_n$, $Z1_{m,n}$) are an approximation of the object 15 to be measured. This approximation is somewhat imprecise because of the uncertainty as to the positions and the dimensions of the beams and columns of the gantry 1, the uncertainty as to the position of the array 2 relative to the gantry 1 and the resolution of the ultrasonic transducers. However, this approximation is arrived at quickly.

In a first embodiment of the invention the array 2 is also displaceable along the Y axis with an amplitude of displacement at least equal to the distance between two adjacent transducers so that the operator can choose a measurement increment along the Y axis which is less than the distance between two adjacent transducers. In a faster but less accurate second embodiment of the invention, step E13 is omitted and the triplets ($X1_m$, $Y1_n$, $Z1_{m,n}$) are replaced in the following description by the triplets ($X_n$, $Y_n$, $Z_{m,n}$) determined in step E12. The choice between these two embodiments of the invention represents a compromise between speed and accuracy and is preferably made by the operator according to the complexity of the shape of the object or the accuracy required of reproductions of the object.

In one embodiment of the invention the array 2 is replaced by a first array of transducers fixed horizontally to the crossmember 13 and a second array of transducers fixed vertically to one end of the crossmember 13, i.e. substantially perpendicular to the first array. The transducers of the first array face downwards and the transducers of the second array face horizontally towards the center of the gantry. The two sets of transducers carried by the arrays, totaling around 40 transducers in all, are displaced along the X axis over the full length of the crossmember 13 with constant co-ordinates on the Y and Z axes. The vertical array is fixed to one end of the crossmember 13 for a first displacement, for example, and then to the other end of the crossmember 13 for a second displacement, so as to scan two opposite sides of the object 15 to be measured which are its longitudinal sides in the FIG. 1 representation.

In a different embodiment of the invention the array of transducers 2 is replaced by five ultrasonic transducers mounted on a support joined to the holding tool 141 of the rack 14. Four of the five transducers are oriented in four directions in a horizontal plane and detect the proximity of an obstacle on displacement of the support in order to prevent any collision during displacement of the support. The fifth transducer is oriented vertically downwards and is used for the measurements. The transducer support is moved through two successive displacement and measurement cycles. The first displacement and measurement cycle is effected at maximal constant height and positions the transducer support at a plurality of positions along the X and Y axes so that the fifth transducer is positioned at successive points with the co-ordinates $(X_m, Y_n)$ as previously defined. The second displacement and measurement cycle is effected at variable height on the basis of the measurements of the first cycle. A consistency check is applied to the measured values.

In a further embodiment of the invention the distance measuring means are not ultrasonic transducers but laser sensors or any other measuring means enabling rapid measurement of the object 15.

In all cases, the set of M×N triplets $(X1_m, Y1_n, Z1_{m,n})$ is used in step E14 to determine a "simple" wire-mesh model of the object to be measured. This wire-mesh model comprises surface meshes $M_1$ through $M_K$ which are quadrilateral or trilateral surfaces. K is an integer. The meshes are preferably made plane by smoothing the values of the Z-axis co-ordinates $Z1_{m,n}$. Each mesh $M_k$ is smaller than the field of the measurement probe used in step E30 and described in detail with reference to FIG. 6. The index k is an integer index between 1 and K.

The wire-mesh modeling is performed automatically by the computer or interactively by an operator who chooses areas in which intermediate points are created and areas that are not to be meshed, for example areas in which the measured co-ordinates are to those of the platform 11 and not to those of the object 15 to be measured.

Figure 6:
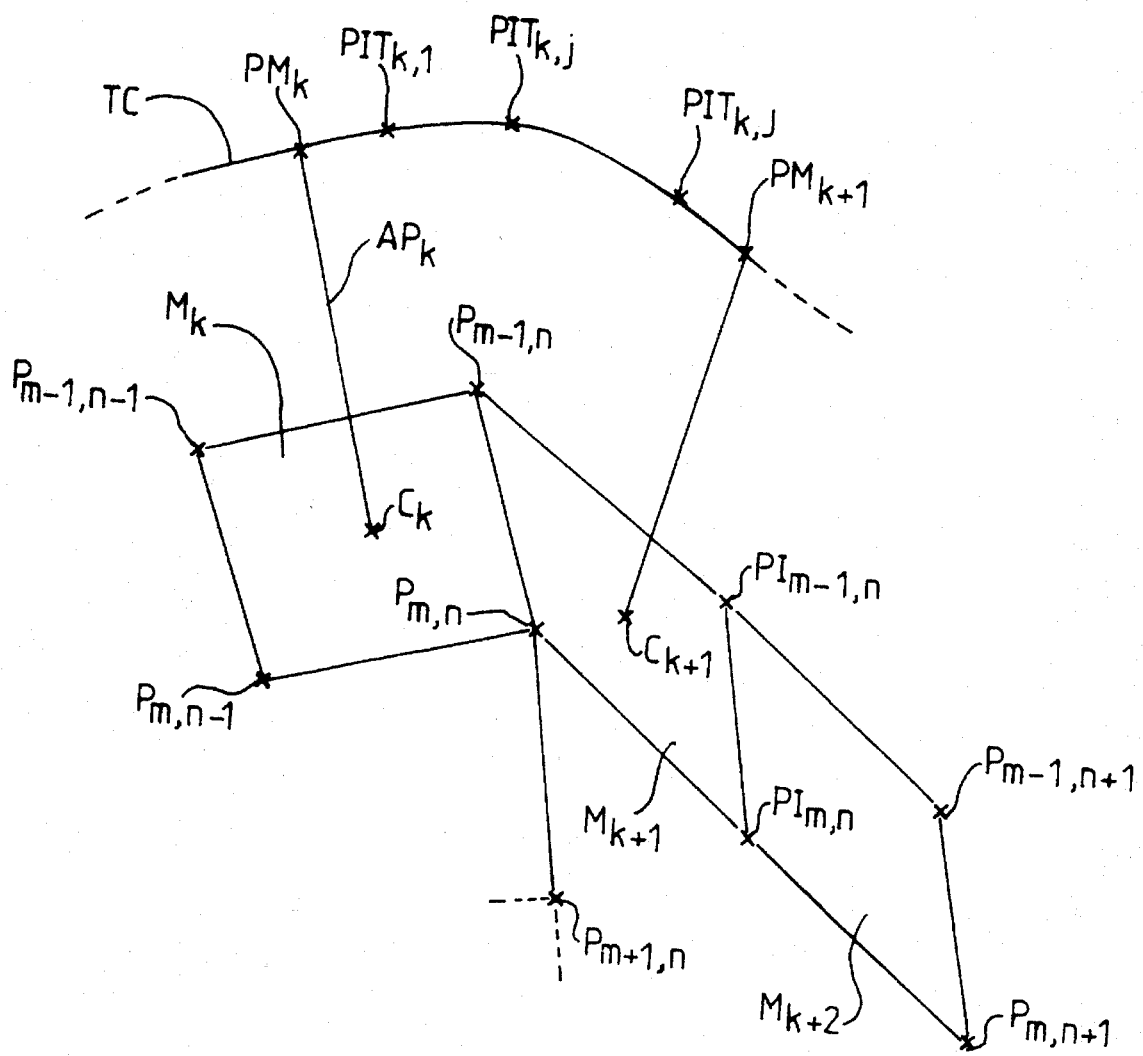
FIG. 6 is a diagrammatic representation of a portion of meshing of the surface of an object and the trajectory of a measuring sensor of the invention.

Referring to FIG. 6, part of the wire-mesh model is formed from points $P_{m-1,n-1}$, $P_{m-1,n+}$, $P_{m-1,n+1}$, $P_{m,n-1}$, $P_{m,n}$, $P_{m,n+1}$ and $P_{m+1,n}$ with the respective co-ordinates $(X1_{m-1}, Y1_{n-1}, Z1_{m-1,n-1})$, $(X1_{m-1}, Y1_n, Z1_{m-1,n})$, $(X1_{m-1}, Y1_{n+1}, Z1_{m-1,n+1})$, $(X1_m, Y1_{n-1}, Z1_{m,n-1})$, $(X1_m, Y1_n, Z1_{m,n})$, $(X1_m, Y1_{n+1}, Z1_{m,n+1})$ and $(X1_{m+1}, Y1_n, Z1_{m+1,n})$.

To guarantee that a mesh $M_k$ has a surface less than a predetermined required value, it is necessary to compare the values of co-ordinates of adjacent points. The abscissae and the ordinates of the points are determined by the gap between two adjacent measurement points of the array 2 in step E13 and the distance between adjacent transducers on the array 2; accordingly, only the Z-axis co-ordinates of the points influence the surface area of the mesh to be formed. For an area comprising points with Z-axis co-ordinates that are not much different, four adjoining points $P_{m-1,n-1}$, $P_{m-1,n}$, $P_{m,n-1}$ and $P_{m,n}$ define a quadrilateral mesh $M_k$. Intermediate points are created between points of an area whose Z-axis co-ordinates differ by more than a predetermined threshold.

Depending on the difference between the Z-axis co-ordinates of neighboring points, one or more intermediate points are created between two points with different Z-axis co-ordinates and are regularly distributed along the straight line segment between the two points with different Z-axis co-ordinates. For example, intermediate points $PI_{m-1,n}$ and $PI_{m,n}$ are respectively created between points $P_{m-1,n}$ and $P_{m-1,n+1}$ and between points $P_{m,n}$ and $P_{m,n+1}$. Two quadrilateral meshes $M_{k+1}$ and $M_{k+2}$ are each created by the association of four neighboring points.

The wire-mesh model of step E14 is used in step E20 to determine the various measuring positions $PM_1$ through $PM_R$ of the shape measurement sensor and its trajectory TC.

Also, the M×N triplets $(X1_m, Y1_n, Z1_{m,n})$ are used to determine "forbidden" areas in which there are no measurement points $PM_1$ through $PM_R$, to prevent any risk of collision on displacement of the shape measuring sensor. A prohibited area is, for example, a parallelepiped surrounding an obstacle with which the sensor may collide, with a safety margin around the exact dimensions of the obstacle.

In a different embodiment of the invention the main step E10 or part of the steps E11 through E14 can be omitted, for example when a model of the object in the form of points analogous to the points $P_{m,n}$ or in the form of meshes analogous to the meshes $M_k$ is already memorized and can be used in step E20.

Figure 7:
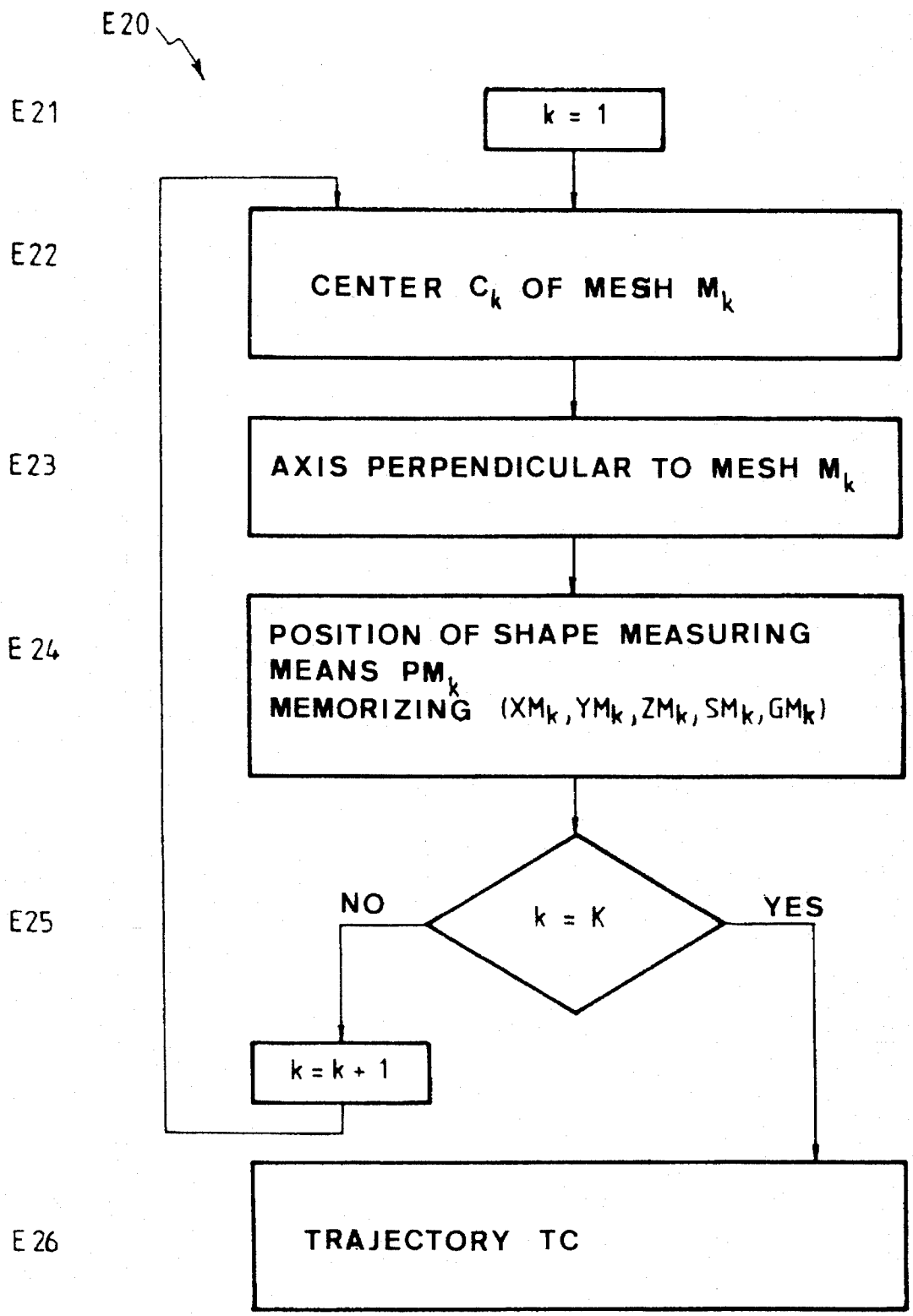
FIG. 7 shows an algorithm for determining a trajectory of a shape measuring sensor of the invention.

Referring to FIG. 7, the main step E20 comprises a set of processing operations carried out in succession on each mesh $M_1$ through $M_K$. Step E21 is the initialization of the processing for the first mesh $M_1$. Step E22 determines the center $C_k$ of the mesh $M_k$, where K is an integer index between 1 and the number K of meshes determined in step E14. The center $C_k$ is determined by geometrical calculation of the intersection of straight line segments passing through the corners of the mesh $M_k$ when the latter is a quadrilateral as shown in FIG. 6. The center $C_k$ is usually the barycenter of the mesh $M_k$. In an alternative embodiment of the invention step E22 is replaced with a step of projecting a predetermined array of points onto the meshes $M_1$ through $M_K$ so that there is at least one projected point per mesh. In the following explanations, the centers $C_k$ are then replaced by these projected points.

Step E23 determines an axis $AP_k$ substantially perpendicular to the mesh $M_k$ and passing through the center $C_k$.

A measurement position $PM_k$ is determined for the mesh $M_k$ in step E24. The measurement position $PM_k$ is a point in space at which shape measuring means in the form of an optical measurement sensor 3 described in detail below are positioned. The determination of the position $PM_k$ is subject to conditions which include:

the distance between the measurement position $PM_k$ and the center $C_k$ of the mesh $M_k$ is equal to a predetermined optimal measurement distance DOM dependent on the measurement sensor, for example 1 250 mm ±150 mm;

the measurement position is on the axis $AP_k$ passing through the center $C_k$ so that the optical sighting axis is "perpendicular" to the surface of the mesh $M_k$, or only slightly inclined to the normal to the latter if the sensor cannot be positioned perpendicular to the mesh $M_k$ for mechanical reasons;

at least three reference panels $16_e$, $16_h$ and $16_i$ are visible by the sensor from the measurement position, h and i being different from e and between 1 and E;

the surface portion measured by the sensor on the object 15 overlaps partially adjacent measured surface portions.

If the above conditions are mutually contradictory for any measurement position, the operator assigns priorities to the various conditions or elects to eliminate a condition, or a plurality of measurement positions are determined for a single mesh, each position respecting the stated conditions in such a manner as to determine at least one measurement position for the mesh $M_k$.

The measurement position $PM_k$ is memorized and comprises:

the sensor position in the form of co-ordinates $(XM_k, YM_k, ZM_k)$ expressed in the fixed system of axes (O, X, Y, Z), and the orientation of the sensor in the form of the sight $SM_k$ of the optical axis of the sensor relative to the horizontal plane (O, X, Y) and the bearing $GM_k$ of the optical axis of the sensor relative to one of the three axes of the system of axes, for example the X axis.

Step E25 verifies if all the meshes $M_1$ through $M_K$ have been selected to determine measurement positions $PM_1$ through PM$_K$. If there are still meshes to be selected, steps E22 through E24 are carried through for a new mesh. When all the meshes have been processed, R measurement positions PM$_1$ through PM$_R$ are in memory where R is an integer greater than or equal to K.

Step E26 then determines the trajectory TC of the shape measuring sensor to link the measurement positions PM$_1$ through PM$_R$. The order of the positions in the trajectory is chosen to favor a single direction between a succession of positions and to minimize the displacements of the sensor for the trajectory as a whole. To avoid overcomplicating the notation it is assumed hereinafter that the ordered measurement positions of the trajectory are renamed PM$_1$ through PM$_R$ in a sequence conforming to their order in the trajectory.

Between two consecutive positions PM$_k$ and PM$_{k+1}$, the trajectory TC follows as best it can the meshing of the object at the optimal measurement distance DOM, without the sensor approaching the object to less than a predetermined safe distance DS. The co-ordinates of intermediate trajectory points PIT$_{k,1}$ through PIT$_{k,j}$ between the two measurement positions PM$_k$ and PM$_{k+1}$ are calculated to ensure that the safe distance DS is respected all along the trajectory, especially in convex areas, as shown in FIG. 6.

The complete determination of the trajectory comprises, for a displacement between two measurement positions, the determination of at least one displacement of one of the following members:

crossmember 13 along the X axis, rack 14 along the Y axis along the crossmember 13 or the Z axis, and measurement sensor rotation (see below).

Said displacement is associated with speeds and accelerations chosen to minimize vibration. Trajectory determination is conventional in robotics and includes determination of control parameters for the drive motors of the mobile crossmember and rack and the measurement sensors corresponding to successive movements of the sensor to the measurement positions PM$_1$ through PM$_R$.

The wire-mesh model of the object to be measured and the trajectory TC are preferably shown on a display screen. An operator can then modify the trajectory in a given area, for example.

Figure 8:
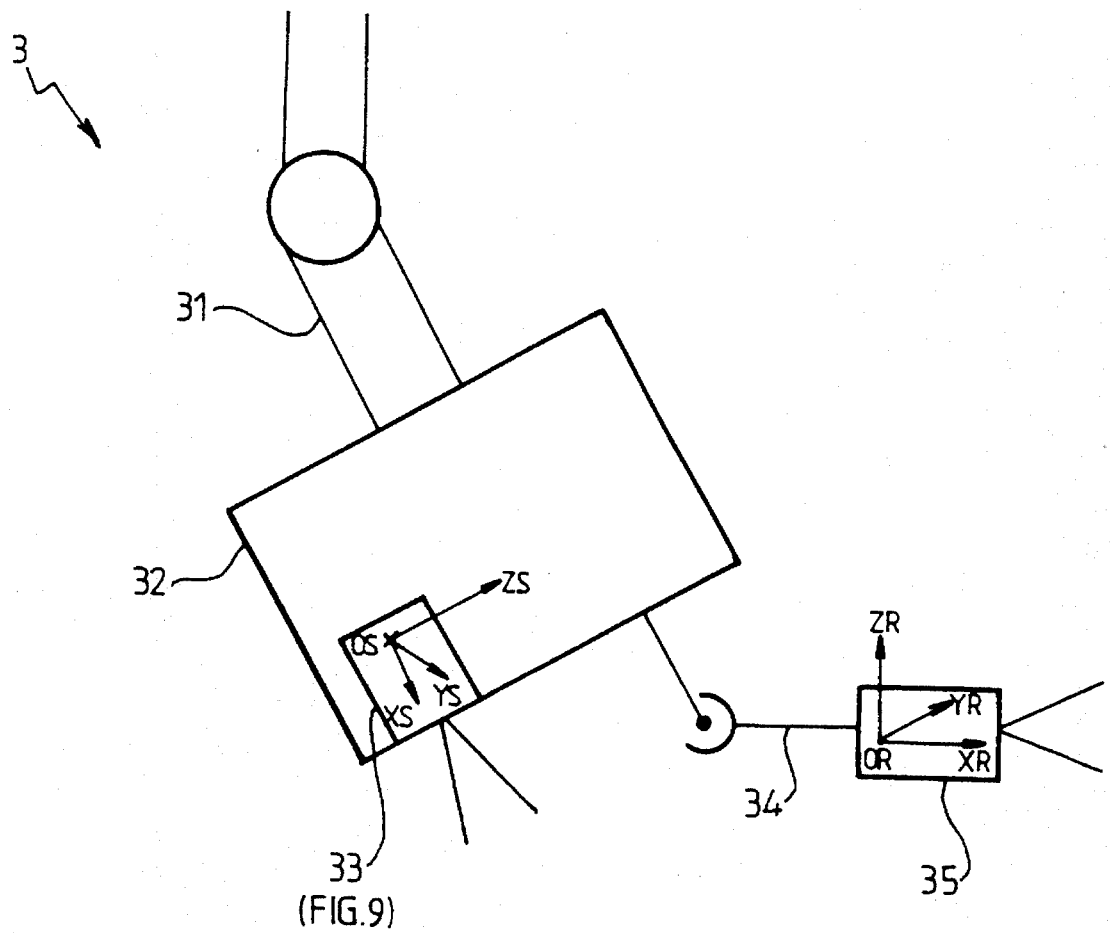
FIG. 8 is a diagrammatic view of a shape measuring sensor of the invention.

Referring to FIG. 8, the shape measurement sensor 3 comprises a first articulated and motorized wrist 31 to the end of which is fixed a support 32 for an optical measurement probe 33 and for a second articulated and motorized wrist 34 on which a reference camera 35 is mounted.

The first wrist 31 is a conventional robot wrist with three degrees of freedom mechanically coupled to the holding tool 141 as shown in FIG. 1. It has electrical and data connections that are not shown. In an alternative embodiment of the invention the wrist 31 is permanently fixed to the lower end of the rack 14, near the holding tool 141, which in this case is used only for the array 2 as previously described.

The first articulated wrist 31 defines the sight relative to the horizontal plane (O, X, Y) and the bearing relative to the X axis of the optical probe 33.

Figure 9:
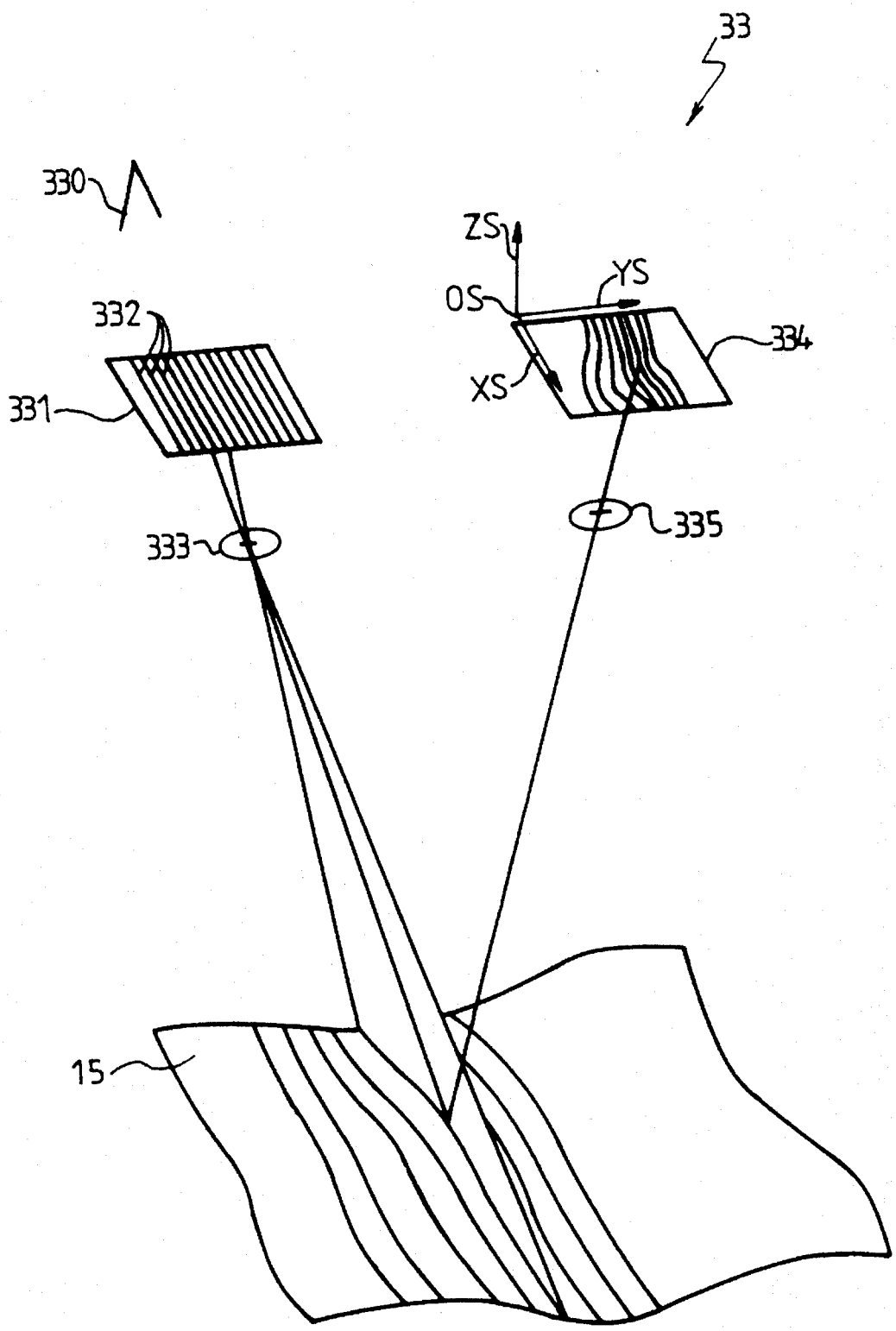
FIG. 9 is a diagram showing the shape measuring sensor above a surface portion of an object to be measured.

The optical probe 33 scans successive surface portions of the object to be measured to deduce the three-dimensional shape of the object using the phase encoding profile measurement technique. Referring to FIG. 9, the probe 33 comprises a light source 330 which illuminates a grating 331 with parallel fringes or lines 332 with a spatial variation of luminous intensity in a direction perpendicular to their own direction. The light rays passing through the grating 331 are projected in a manner known in itself through an optical system 333 to form the image of the grating on a surface portion of the object 15 to be measured. P fields of fringes having a phase-shift increment of 2 π/P are preferably projected in succession by lateral displacement of the grating 331. The value of P is 4 or 8, for example. Photodetectors 334 disposed on a rectangular plane support detect the image of the grating through an optical system 335. The images on the photodetectors 334 of the lines 332 are representative of the surface portion of the object to be measured.

In a local system of axes (OS, XS, YS, ZS) fixed relative to the probe 33, the axis ZS being orthogonal to the plane of the photodetector 334, the ZS-axis co-ordinates of the points of the surface portion of the object 15 to be measured are determined by analysis of the phase of the light signal received by each photodetector 334. For example, for P=4 the signals output by the photodetectors are of the form:

$$S_0 = a + b \cdot \cos \phi,$$

$$S_1 = a + b \cdot \sin \phi,$$

$$S_2 = a - b \cdot \cos \phi,$$

and $$S_3 = a - b \cdot \sin \phi.$$

In the above expressions, a and b are unknown coefficients respectively depending on the ambient luminosity and the reflective power of the surface portion of the object 15. φ is the phase modulo 2 π of the signal from a photodetector and is given by the equation:

$$\phi = \arctan \frac{S_1 - S_3}{S_0 - S_2}.$$

The phase φ is determined to the nearest 2 π. This indeterminacy in respect of the phase is removed by using a second grating to project P fields of fringes having a different increment than the fringes of the first grating and with a phase-shift of 2 π/P from one field to the next, and by carrying out analogous calculations on the photodetector signals.

In the local system of axes (OS, XS, YS, ZS) of the probe, the ZS-axis co-ordinates of the points of the surface portion of the object to be measured are determined from absolute values of the phases of the photodetector output signals. The abscissae and ordinates of points on the surface of the object depend on the abscissae and ordinates of the photodetectors, to which they are related in ways predetermined beforehand by conventional calibration of the probe 33.

The usable volume measurable by the probe 33 is, for example, 600 mm along the XS axis, 400 mm along the YS axis and 300 mm along the ZS axis, with a photodetector covering approximately 1.5 mm along the XS and YS axes and an accuracy on the ZS axis of about 0.10 mm. The measurement dimensions of the probe along the XS and YS axes are equal to the dimensions of the rectangular plane support of the photodetectors 334 and define the field of the probe 33.

Referring again to FIG. 8, the second articulated wrist 34 determines the orientation of the reference camera 35 relative to the support 32, i.e. relative to the optical probe 33. The articulated arm 34 is motorized to adopt discrete orientations with high accuracy, in the order of ±5 μrad. The number of possible orientations is typically between several hundred and one thousand.

The reference camera 35 is a CCD camera associated with a reference system of axes (OR, XR, YR, ZR). The camera 35 determines accurately the co-ordinates ($XM_r$, $YM_r$, $ZM_r$) of the measurement position $PM_r$ in the fixed system of axes (O, X, Y, Z), these co-ordinates being known with insufficient accuracy because of the structure of the gantry 1 in particular.

As previously explained, a measurement position $PM_r$ of the sensor 3 is associated with at least three reference panels $16_e$, $16_h$ and $16_i$ comprising points materialized by targets the co-ordinates of which are exactly known in the system of axes (O, X, Y, Z) of the gantry.

The camera 35 is aimed at the three reference panels in succession. The point of intersection of the optical axis of the camera 35 and each panel is determined accurately by its co-ordinates in the system of axes (O, X, Y, Z) from the known co-ordinates of the targets in the system of axes (O, X, Y, Z).

The three points of intersection and the orientation of the camera 35 when it is aimed at the three panels define three intersecting straight line segments. Experience has shown that these three straight line segments are defined more accurately if the camera 35 and the three panels $16_e$, $16_h$ and $16_i$ are not in substantially the same plane, which is achieved here by the different heights of the panels.

The point of intersection of these three straight line segments is the center OR of the reference system of axes defined below. The axis ZR is the straight line segment through one of the points of intersection and the center OR; the axes XR and YR are determined by rotation to form the second and third axes of the orthogonal reference system of axes. A first transformation matrix TR from the reference system of axes to the fixed system of axes is in this way fully established for the position $PM_r$ of the sensor.

A second transformation matrix TRS from the local system of axes (OS, XS, YS, ZS) of the probe 33 to the reference system of axes (OR, XR, YR, ZR) is established according to the orientation of the articulated wrist 34.

The transformation matrices TR and TRS transform the co-ordinates ($X_s$, $Y_s$, $Z_s$) of any point of a surface portion expressed in the probe system of axes into the co-ordinates ($X_F$, $Y_F$, $Z_F$) of the point expressed in the fixed system of axes:

$$\begin{pmatrix} X_F \\ Y_F \\ Z_F \end{pmatrix} = TRS \times TR \times \begin{pmatrix} X_S \\ Y_S \\ Z_S \end{pmatrix}.$$

In the above expression, the result of multiplying the matrices TRS and TR is a third transformation matrix from the local system of axes of the probe 33 to the fixed system of axes.

In an alternative embodiment of the invention, the support 32 is joined rigidly to the rack 14, the probe 33 is joined to the support 32 by an articulated wrist similar to the wrist 34 and the camera 35 is joined to the support 32 by the wrist 34. In a further embodiment of the invention the measurement sensor 3 does not comprise either the articulated wrist 34 or the camera 35. The position of the sensor 3 is determined by the measurement probe 33 in a manner analogous to that previously described. In this case the measurement probe 33 is used alternately for determining the sensor position and for measuring the object.

In a further embodiment of the invention the measurement sensor 3 further comprises an anticollision device for detecting the proximity of an obstacle during displacement of the sensor 3, using at least five ultrasonic transducers of which four are directed in different horizontal directions, for example, in two opposite pairs, for example, and one is directed vertically downwards. The anticollision device checks that the sensor 3 remains at a sufficient distance from any obstacle throughout the measurement period. The anticollision device complements the determination of forbidden areas and is particularly advantageous if there may now be obstacles on the trajectory of the sensor 3 when there were none in step E10.

Referring to FIG. 10, the main measurement step E30 comprises a first step E31 of mounting the sensor 3 on the holding tool 141 of the rack 14 of the gantry. This comprises mechanical coupling of the sensor and the holding tool and electrical and data connections. The mounting step is not carried out if the sensor 3 is permanently joined to the rack 14.

Step E32 initializes the measurement. The measurement sensor 3 is displaced from the mounting position to the first measurement position $PM_1$, that is to say r=1, of the trajectory TC so that the center OS of the system of axes fixed relative to the probe 33 coincides with the measurement position $PM_1$ and the orientation of the probe and of the system of axes (OS, XS, YS, ZS) is that defined by the sight $SM_1$ and the bearing $GM_1$ of the first position $PM_1$ relative to the fixed system of axes (O, X, Y, Z).

Steps E33 through E36 are then carried out for each measurement position $PM_1$ through $PM_R$ of the trajectory TC.

In step E33 the measurement sensor 3 is displaced from the position $PM_{r-1}$ to position $PM_r$. As already stated, this displacement is defined by the trajectory TC and achieved by simultaneous or successive displacements of the crossmember 13, the rack 14 and the articulated wrist 31.

When the sensor 3 has reached the measurement position $PM_r$, the determination of the measurement position and the measurement of the surface portion are carried out after a predetermined time interval of between about ten seconds and about twenty seconds, the sensor being deemed to have stabilized at the end of this time.

Step E34 measures the surface portion of the object 15 as described previously with reference to FIG. 9.

Step E35 determines the accurate position of the probe 33 in the fixed system of axes (O, X, Y, Z) fixed relative to the gantry 1 by means of the camera 35 pointed at each of the three panels $16_e$, $16_h$ and $16_i$ in succession, as previously described.

In an alternative embodiment of the invention the measurement and measurement position determination steps are carried out in parallel, and in a further embodiment of the invention the measurement position determination precedes the measurement.

Step E36 changes the system of axes: the co-ordinates measured in step E34 in the system of axes of the probe are then expressed in the fixed system of axes (O, X, Y, Z) of the gantry. This step is carried out by matrix calculation of the transformations between the probe, reference and fixed systems of axes, as previously described. The co-ordinates expressed in the fixed system of axes (O, X, Y, Z) are then memorized.

Step E37 verifies that the sensor has been moved to all the positions $PM_1$ through $PM_R$ on the trajectory TC. If not, steps E33 through E37 are carried out for a new position. When all of the trajectory TC has been covered, the main measurement step E30 is complete.

An operator can preferably intervene to modify steps E32 through E36. In particular, the operator can eliminate measurement positions so that measurements are not taken in a given surface area. The operator can divide the trajectory TC into subtrajectories corresponding to respective parts of the object to be measured; the probe is moved over these subdirectories successively. The operator can define additional measurement positions for measuring a surface part of the object more accurately. The additional measurement positions are interleaved between two measurement positions of the trajectory and therefore modify the latter or, in a different embodiment of the invention, form a supplementary trajectory which is covered after the trajectory TC.

As already stated, the result of the main step E30 is processed in step E40 to determine a mathematical model of the object 15.

What we claim is:

1. A method for three-dimensional measurement of the surface of an object by shape measuring means, comprising the steps of:

determining approximate measurement positions of said shape measuring means, positioning said shape measuring means successively at said approximate measurement positions to read off the shape of surface portions of said object, said surface portions being each represented by points of the object, co-ordinates of said points being expressed in a system of axes fixed relative to said shape measuring means, identifying each of said approximate measurement positions of said shape measuring means accurately in a predetermined fixed system of axes, and transforming said co-ordinates of said surface portion points expressed in said system of axes fixed relative to said shape measuring means into co-ordinates of said surface portion points expressed in said predetermined fixed system of axes according to said approximate measurement positions of said shape measuring means identified in said fixed system of axes respectively.

2. The method according to claim 1 wherein said step of identifying each of said approximate measurement positions of said shape measuring means comprises the steps of:

pointing reference means fixed relative to said shape measuring means successively towards at least three predetermined points in said fixed system of axes, determining the orientations of said reference means in said fixed system of axes for said three predetermined points respectively, defining a reference system of axes fixed relative to said reference means on the basis of said three predetermined points and said orientations, and establishing a first transformation matrix from said reference system of axes to said fixed system of axes.

3. The method according to claim 2, wherein said step of transforming comprises the steps of:

establishing a second transformation matrix from said system of axes fixed relative to said shape measuring means to said reference system of axes, and establishing a third transformation matrix from said system of axes fixed relative to said shape measuring means to said fixed system of axes on the basis of said first transformation matrix and second transformation matrix.

4. The method according to claim 1, wherein said step of determining said approximate measurement positions comprises:

generating a wire-mesh model of the surface of said object, said wire-mesh model comprising a plurality of meshes, selecting at least one point on each mesh of said plurality of meshes, defining an axis substantially perpendicular to said each mesh passing through said at least one point, and determining a measurement position substantially situated on said axis.

5. The method according to claim 4, wherein said step of generating a wire-mesh model of the surface of said object comprises the steps of:

positioning at least one distance measuring means at successive predetermined first positions in a plane parallel to a support on which said object rests, measuring first distances from said distance measuring means to said object for said successive predetermined first positions, calculating respective second positions on the basis of said successive predetermined first positions and said first distances so that said second positions are at second distances from said object in a predetermined range, positioning said distance measuring means successively at said second positions and measuring second distances from said distance measuring means to said object for said second positions, and generating said wire-mesh model of said object on the basis of said measured second distances.

6. The method according to claim 4, wherein said step of generating a wire-mesh model of the surface of said object comprises the steps of:

positioning distance measuring means at successive predetermined positions distributed in a measurement space, measuring distances from said distance measuring means to said object for said successive predetermined positions of said distance measuring means respectively, and generating said wire-mesh model of said object on the basis of said measured distances.

7. The method according to claim 6, wherein said step of generating a wire-mesh model of the surface of said object further comprises the step of determining at least one area of space in which there is none of said approximate measurement positions of said shape measuring means.

8. A device for three-dimensional measurement of an object, comprising mobile object shape measuring means operative without contact with said object, said device further comprising:

mobile distance measuring means for measuring distances from said mobile distance measuring means to said object for predetermined measurement positions of said mobile distance measuring means, means for successively positioning said mobile distance measuring means at said predetermined measurement positions, means for positioning said object shape measuring means at positions determined from said predetermined measurement positions of said mobile distance measuring means and from the measured distances so that said mobile shape measuring means read off the shape of surface portions of said object at said determined positions, and means for identifying said determined positions of said mobile shape measuring means in a predetermined fixed system of axes.

9. The device according to claim 8 wherein said mobile distance measuring means comprises at least one ultrasonic transducer.

10. The device according to claim 8, wherein said mobile distance measuring means comprises at least one linear array of ultrasonic transducers.

11. The device according to claim 8, wherein said identifying means comprises a camera movable mounted on said shape measuring means and orientable independently of said mobile shape measuring means, and fixed reference panels, targets being located on faces of said fixed reference panels and having co-ordinates predetermined in said predetermined fixed system of axes thereby identifying positions of said camera and mobile shape measuring means in said predetermined fixed system of axes.

12. The device according to claim 8, wherein at least one of said mobile distance measuring means and mobile shape measuring means comprise means for detecting the proximity of obstacles during displacement of at least one of said mobile distance measuring means and mobile shape measuring means.

13. The device according to claim 8, wherein said mobile shape measuring means comprises an optical probe for reading off the shape of surface portions of said object.

14. The device according to claim 13, wherein said mobile optical probe comprises a light source for illuminating a grating of parallel fringes and forming an image of said grating for each of said surface portions of said object in succession, and photodetectors for detecting said image of said grating.

* * * * *